US008108880B2

(12) United States Patent
Dewey et al.

(10) Patent No.: US 8,108,880 B2
(45) Date of Patent: Jan. 31, 2012

(54) METHOD AND SYSTEM FOR ENABLING STATE SAVE AND DEBUG OPERATIONS FOR CO-ROUTINES IN AN EVENT-DRIVEN ENVIRONMENT

(75) Inventors: Douglas W. Dewey, Tucson, AZ (US); Sangram Singh Ghoman, Tucson, AZ (US); William G. Sherman, Tucson, AZ (US); Shachar Fienblit, Ein Ayala (IL)

(73) Assignee: International Business Machines Corporation, Armonk, NY (US)

( * ) Notice: Subject to any disclaimer, the term of this patent is extended or adjusted under 35 U.S.C. 154(b) by 1364 days.

(21) Appl. No.: 11/682,956

(22) Filed: Mar. 7, 2007

(65) Prior Publication Data

US 2008/0222401 A1 Sep. 11, 2008

(51) Int. Cl.
*G06F 9/46* (2006.01)
(52) U.S. Cl. ...................................................... 718/108
(58) Field of Classification Search .................. 718/108
See application file for complete search history.

(56) References Cited

U.S. PATENT DOCUMENTS

| 5,469,550 | A | | 11/1995 | Cezzar |
| 5,608,684 | A | * | 3/1997 | Reasoner et al. ............. 365/228 |
| 6,412,081 | B1 | | 6/2002 | Koscal et al. |
| 6,766,515 | B1 | * | 7/2004 | Bitar et al. .................... 718/100 |
| 2002/0078404 | A1 | * | 6/2002 | Vachon et al. ................... 714/38 |
| 2004/0172633 | A1 | | 9/2004 | Pizzi et al. |
| 2005/0010912 | A1 | | 1/2005 | Adolphson et al. |
| 2005/0172272 | A1 | | 8/2005 | Bates et al. |
| 2005/0240826 | A1 | | 10/2005 | Dickenson et al. |
| 2006/0150194 | A1 | | 7/2006 | Xing et al. |
| 2007/0118836 | A1 | * | 5/2007 | Mensing ........................ 718/102 |
| 2008/0133898 | A1 | * | 6/2008 | Newburn et al. .............. 712/228 |

FOREIGN PATENT DOCUMENTS

CN 1833231 9/2006

OTHER PUBLICATIONS

Office Action dated Sep. 4, 2009.

* cited by examiner

*Primary Examiner* — Meng An
*Assistant Examiner* — Blake Kumabe
(74) *Attorney, Agent, or Firm* — Kunzler Needham Massey & Thorpe

(57) ABSTRACT

A method of enabling state save and debug operations for co-routines for first failure data capture (FFDC) in an event-driven environment. A stack management utility allocates space for a context structure, which includes a state field, and a stack pointer in a buffer. A context management utility initializes a first context structure of a first co-routine and saves a state of the first context structure in response to an execution request for a second co-routine. The context management utility sets a second context structure as a current context. When execution of the current context is complete, the context management utility restores the first context structure of the first co-routine as the current context. If the state field is not set to a valid value, a state save function "state saves" all allocated co-routine stacks and context structures, restores the entire system to a previous valid state, and restarts operations.

17 Claims, 7 Drawing Sheets

METHOD AND SYSTEM FOR ENABLING STATE SAVE AND DEBUG OPERATIONS FOR CO-ROUTINES IN AN EVENT-DRIVEN ENVIRONMENT

BACKGROUND OF THE INVENTION

1. Technical Field

The present invention relates in general to data processing systems and in particular to a method and system for enabling state save and debug operations.

2. Description of the Related Art

An operating system (OS) typically separates a virtual memory into a kernel space and a user space. The kernel space is typically reserved for running the kernel, kernel extensions, and device drivers, while the user space is reserved for user mode applications. In order to track and control the execution of multiple processes, the OS utilizes a call stack (also referred to as an execution stack) to store information regarding the active subroutines of a computer program. The call stack monitors the execution of multiple processes by keeping track of the points to which each active subroutine should return control after the executions of the active subroutines have been completed.

A co-routine may be utilized to facilitate the porting of code into a set of microcode operating in the kernel space of an OS such that the ported code does not need to be restructured in order to run asynchronously in an event driven (or scan loop) environment. Several co-routine wrappers that executed the ported code on different contexts (or stacks) suspend a corresponding operation when an asynchronous call back is needed from code in the event driven environment. At a call back, the co-routine wrapper restores the context of the corresponding ported code, and the ported code proceeds as if the interrupting function call had been executed immediately. To facilitate the porting of code, an OS often needs to restructure the code to run in a new environment (e.g., by providing conversions to enable operation in a non-native asynchronous environment).

SUMMARY OF A CLAIMED EMBODIMENT

Disclosed are a method, system, and computer program product for enabling state save and debug operations for co-routines in an event-driven environment. A stack management utility allocates space for a context structure, which includes a state field, and a stack pointer in a buffer. A context management utility initializes a first context structure of a first co-routine and saves a state of the first context structure in response to an execution request for a second co-routine. The context management utility sets a second context structure associated with the second co-routine as a current context. When execution of the current context is complete, the context management utility restores the first context structure of the first co-routine as the current context. If the state field is not set to a valid value, a state save function "state saves" all allocated co-routine stacks and context structures to be used in debug and then restores the entire system to a previous valid state and restarts operations.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for enabling state save and debug operations for co-routines in an event-driven environment.

Figure 1:
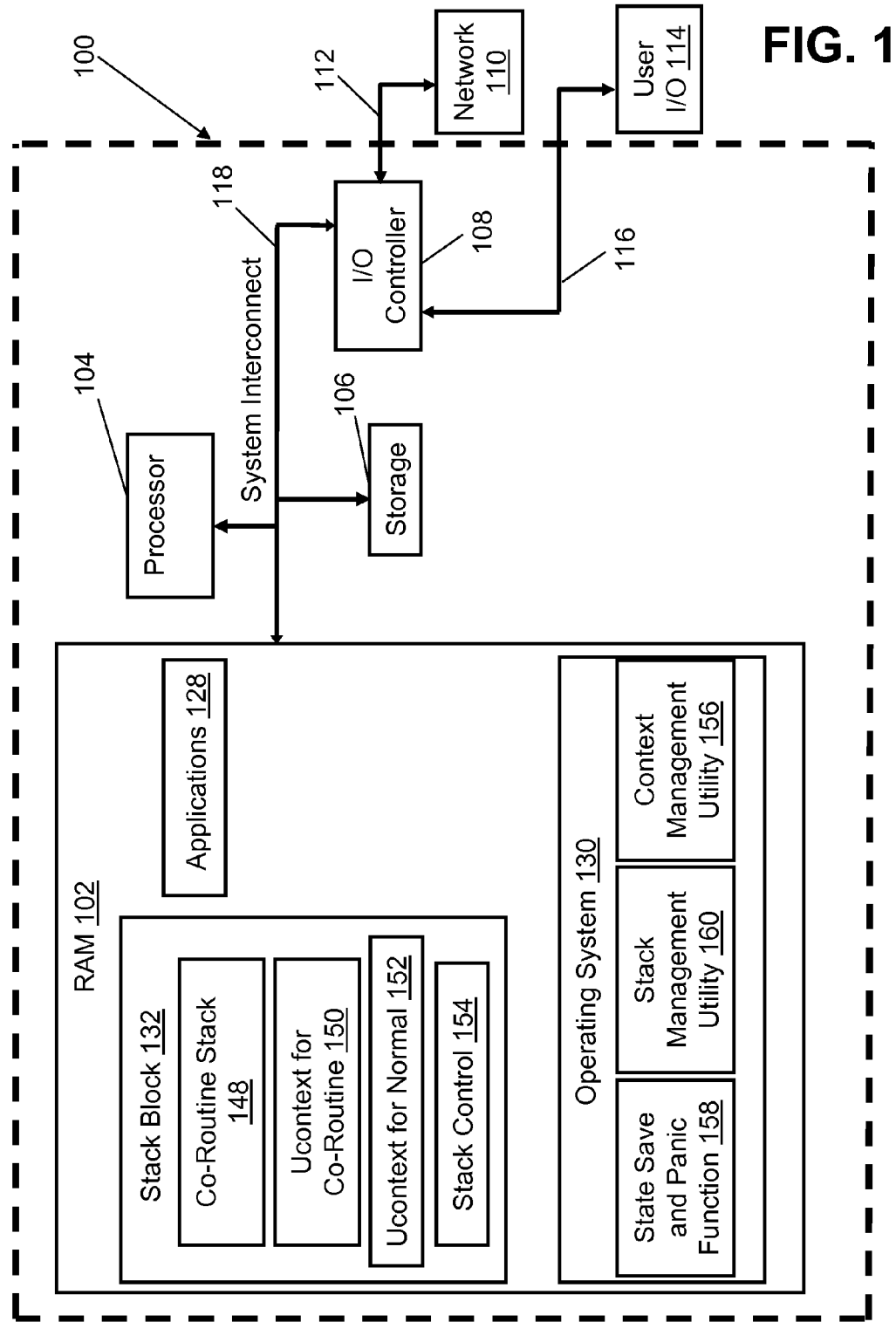
FIG. 1 depicts a high level block diagram of a data processing system, according to an embodiment of the present invention.

With reference now to FIG. 1, there is depicted a block diagram of a general-purpose data processing system, according to an embodiment of the present invention. Data processing system 100 contains random access memory (RAM) 102, processor 104, and input/output (I/O) controller 108. System interconnect 118 connects processor 104, RAM 102, storage 106, and I/O controller 108. Data processing system 100 also includes non-volatile storage 106 such as a hard disk drive or other direct-access storage device. I/O controller 108 provides connectivity to network 110 through a wired or wireless link, such as network cable 112. I/O controller 108 is also coupled to user I/O devices 114 (e.g., a keyboard, a display device, a mouse, or a printer) via I/O communication link 116 (e.g., cables or a wireless connection).

According to the illustrative embodiment, data processing system 100 stores stack block 132, one or more applications 128, and operating system (OS) 130 within RAM 102. Stack block 132 includes co-routine stack 148, multiple context data structures (referred to herein as "Ucontext") for co-routines 150, Ucontext for "normal" code 152, and stack control 154. As utilized herein, normal code is defined as code typically executed by data processing system 100 (e.g., applications 128). Ucontext functions (e.g., "getcontext", "makecontext", "setcontext", and "swapcontext") enable OS 130 to manipulate context data structures. The "getcontext" Ucontext function enables OS 130 to initialize a context structure with the register contents corresponding to a currently executing process. The "makecontext" Ucontext function alters a context, such that the context utilizes a different stack. The "setcontext" Ucontext function sets the currently executing process to a given context and executes using a set of registers that correspond to the given context. Similarly, the "swapcontext" Ucontext function enables OS 130 to save the current context in a context data structure and set the currently executing context to another context. FIGS. 3-9, which are discussed below, depict the processes/methods of manipulating context data structures of co-routines.

Co-routine stack 148 stores information corresponding to a co-routine being executed asynchronously by processor 104. Within stack block 132, Ucontext for co-routine 150 and Ucontext for normal 152 store context information, including locations and stack pointers that identify the most recently executed code, for a co-routine and normal code, respectively. Stack control 154 enables OS 130 to manage stack blocks 132, according to processes illustrated in FIGS. 3-8, which are discussed below. Each active co-routine in the system has a corresponding stack block 132 allocated, and stack block 132 is used by OS 130 to track multiple co-routines.

OS 130 includes state save and panic function 158, stack management utility 160, and context management utility 156. Stack management utility 160 and context management utility 156 enable OS 130 to interact with stack control 154 and manipulate data in stack block 132. A state field within each Ucontext data structure 150 and 152 enables OS 130 to determine whether a context is valid (i.e., scheduled to be executed), currently being executed by processor 104, or has yet to be executed. A list of stack blocks 132 is managed by OS 130 using the embedded stack controls 154 to enable OS 130 to determine most recently used and least recently used co-routines. State save and panic function 158 enables OS 130 to manipulate stack blocks 132, according to the processes illustrated in FIGS. 3-9, which are discussed below.

The following paragraph provides an overview of the state save process. State save is an early part of the state save and panic function 158 and is used to store data structures to permanent storage for use in debug operations. As utilized herein, "state save" refers to saving the context information associated with a co-routine. The described embodiments of the invention provide a means to state save stacks and associated structures for first failure data capture (FFDC) or to enable a component of OS 130 to accomplish a state save, without requiring different components to include redundant state save code. FIGS. 3-9 each illustrate different portions of the state save process that the invention modifies and are described below. Stack management utility 160 allocates space for a Ucontext structure, which includes a state field, and a stack pointer in stack block 132. Context management utility 156 initializes a first context structure of a first co-routine and saves a state of the first context structure in response to an execution request for a second co-routine. Context management utility 156 sets a second context structure associated with the second co-routine as a current context. When execution of the current context is complete, context management utility 156 restores the first context structure of the first co-routine as the current context. When the co-routine is no longer needed, the corresponding stack block 132 is de-allocated. If the state field is not set to a valid value, state save and panic function 158 executes a state save to restore stack block 132 to a previous valid state and restart operations.

Figure 2:
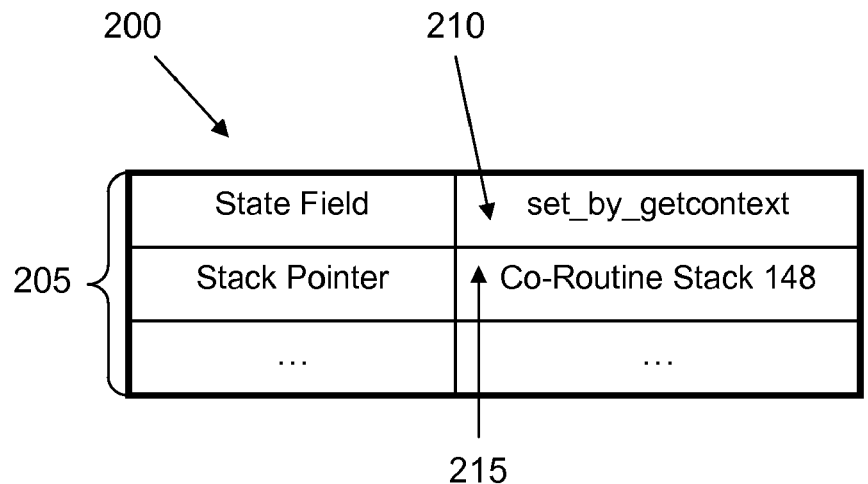
FIG. 2 depicts a high level block diagram of an exemplary context data structure, according to an embodiment of the present invention.

With reference now to FIG. 2, there is depicted a high level block diagram of an exemplary context data structure 200, as used by Ucontext for co-routine 150 and Ucontext for normal 152, according to an embodiment of the present invention. Context data structure 200 includes multiple context data fields 205. Context data fields 205 include state field value 210 and stack pointer value 215. The values shown in state field value 210 and stack pointer value 215 are provided solely for illustration. According to the illustrative embodiment, state field value 210 contains a "set_by_getcontext" value, which indicates that context data structure 200 was updated by the getcontext Ucontext function. Similarly, stack pointer value 215 identifies a location in co-routine stack 148 (in the case of Ucontext for co-routine 150) or a location in the normal stack for the process (in the case of Ucontext for normal 152). OS 130 stores context information for one or more active co-routines in multiple context data structures 200 within RAM 102.

Figure 3:
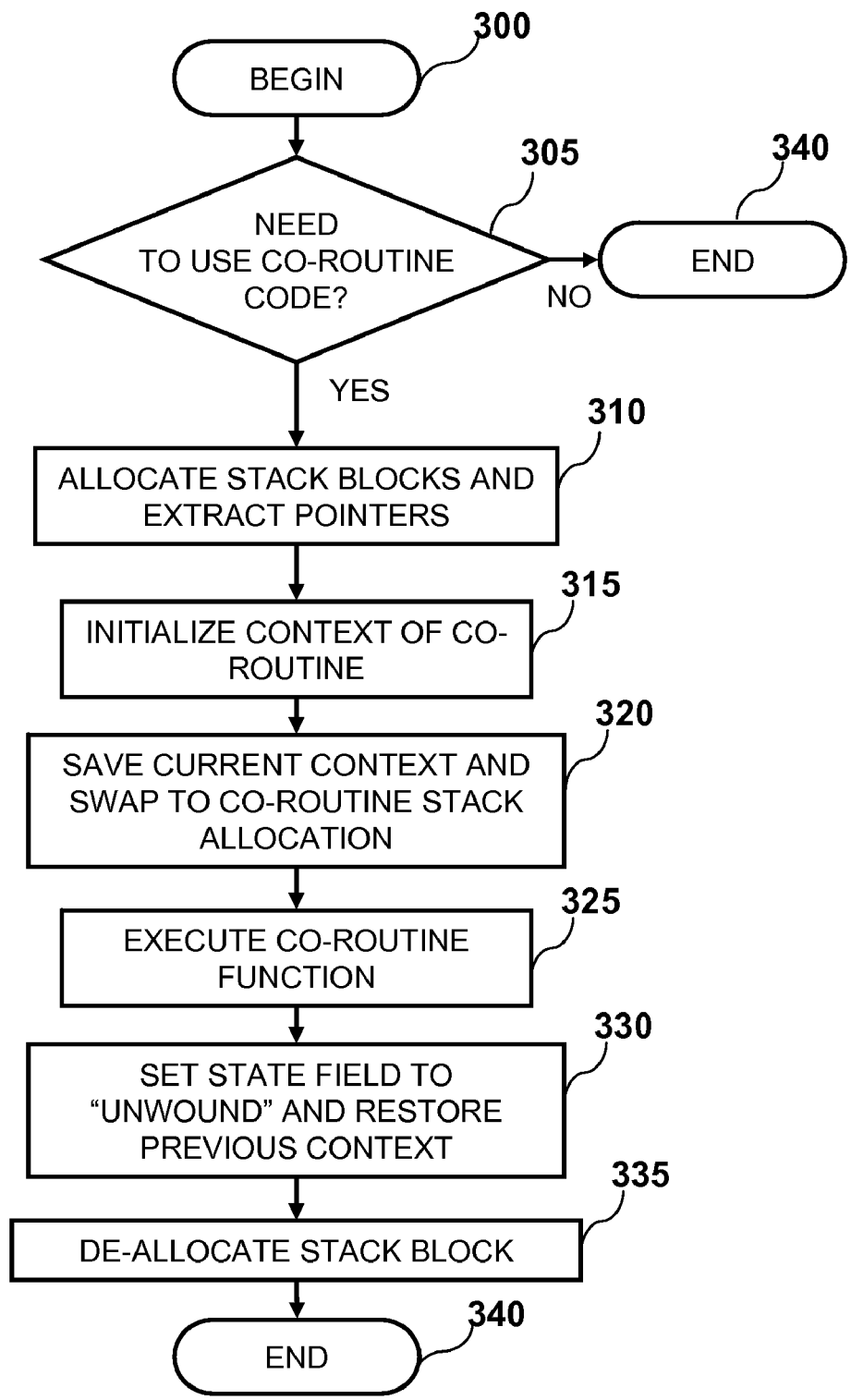
FIG. 3 is a high-level logical flowchart of a process for enabling state save and other debug operations for co-routines in an event-driven environment, according to an embodiment of the present invention.

With reference now to FIG. 3, there is depicted a high-level logical flowchart of a process for enabling state save and other debug operations for co-routines in an event-driven environment, according to an embodiment of the present invention. The process begins at block 300 in response to OS 130 executing code. A determination is made whether the operations performed by the code require the use of co-routines, as depicted in block 305. If the code does not require co-routines, the process terminates at block 340. If the code requires co-routines, stack management utility 160 allocates a block within stack block 132 and extracts stack pointers from stack block 132, as shown in block 310. The allocated block corresponds to the co-routine.

Figure 8:
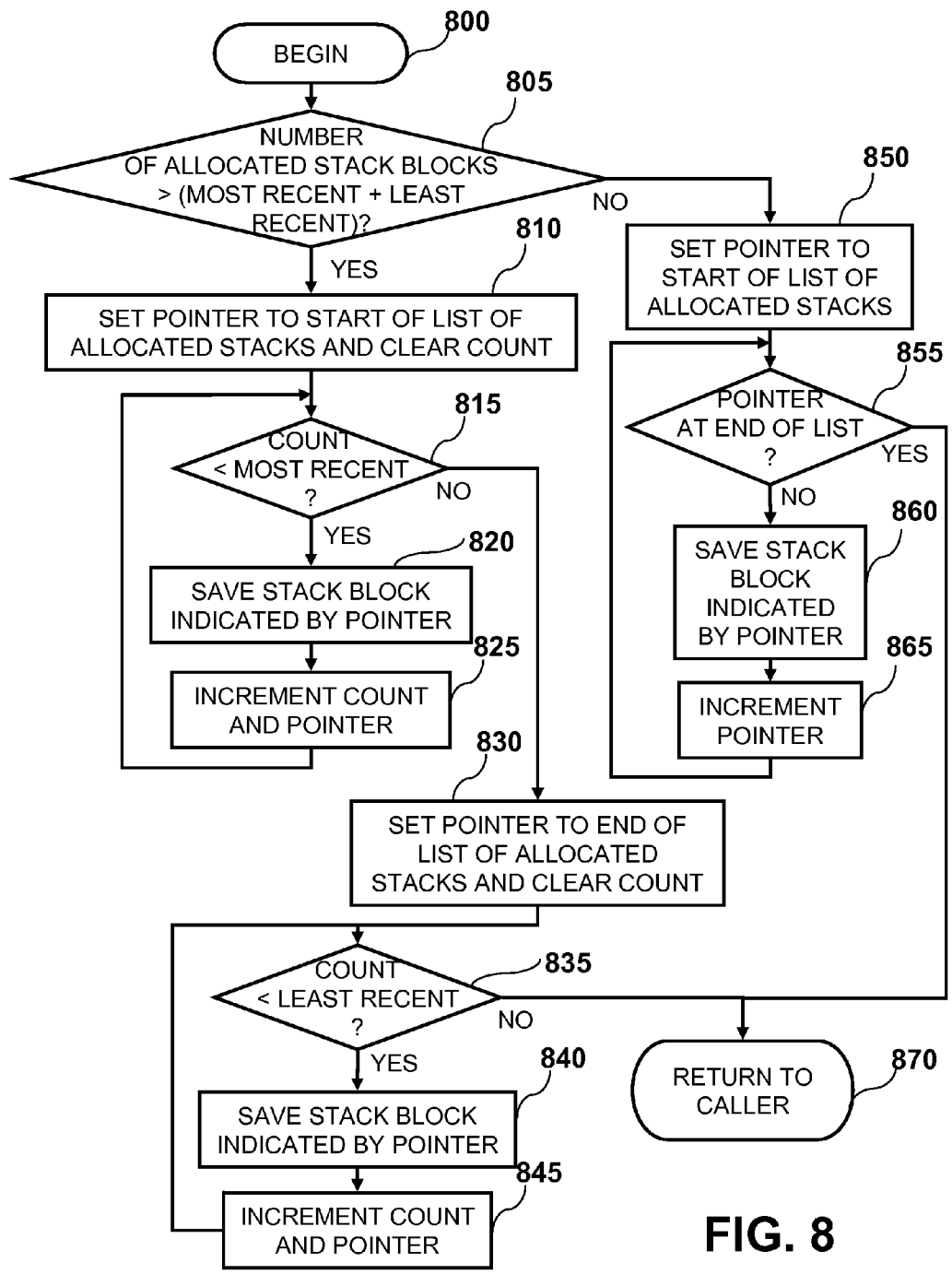
FIG. 8 is a high-level logical flowchart of a method of implementing a controlled state save of stack blocks as an early part of a state save and panic function, according to an embodiment of the present invention.
Figure 9:
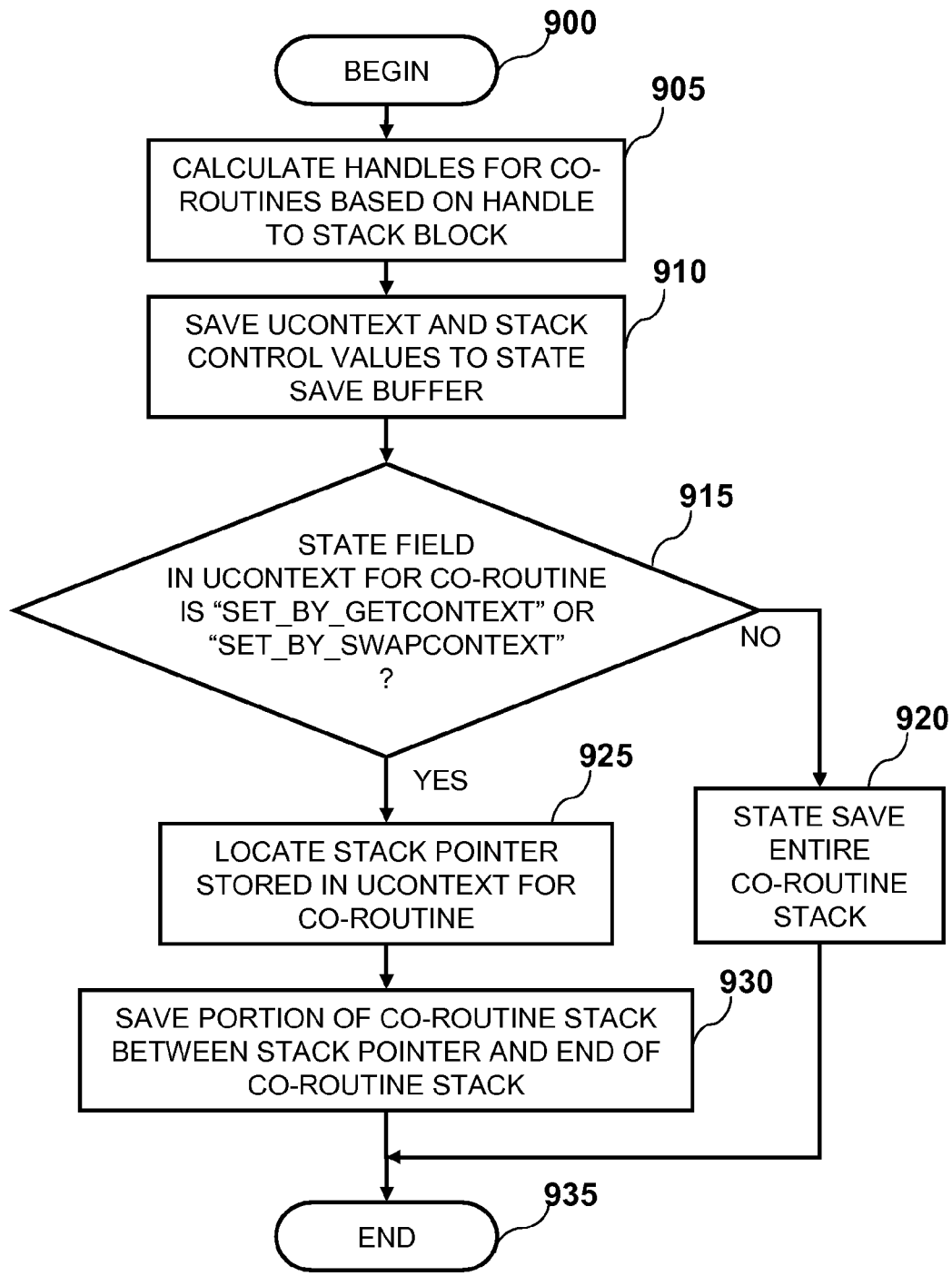
FIG. 9 is a high-level logical flowchart of an alternative method of implementing a state save of a single stack block as an early part of a state save and panic function, according to the present invention.

In one embodiment, each stack control 154 contains pointers corresponding to a double linked-list. As utilized herein, a double linked-list is defined as a series of nodes (e.g., stack blocks) that contain context data, a pointer to the previous node, and a pointer to the next node. Stack management utility 160 utilizes an "AllocateStack" function to add allocated stack blocks 132 to the end of the double linked-list. Similarly, stack management utility 160 utilizes a "DeallocateStack" function to remove context structures from the double linked-list. At state save time, state save and panic function 158 accesses the most recently used stack buffers at the front of the double linked-list. State save and panic function 158 also accesses the least recently used stack buffers at the end of the double linked list, thereby enabling a state save to save stack block 132 to permanent storage for use in debug. The process by which stack block 132 is saved to permanent storage is illustrated in FIGS. 8-9, which are discussed below.

Returning now to FIG. 3, applications 128 allocate a block within stack block 132 from stack management utility 160, as shown in block 310. Stack management utility 160 removes a block from a list of unallocated (i.e., "free") stack blocks. An "Allocate Stack" function within stack management utility 160 subsequently adds the block that was removed from the list of unallocated stack blocks to a list of allocated stack blocks, and stack management utility 160 sets the state field of the allocated stack block to an "allocated" value. Applications 128 initialize the context of the co-routine that will be executed by setting values in Ucontext for co-routine 150, as depicted in block 315. Applications 128 then utilize a "swapcontext" Ucontext function within context management utility 156 to save the current context in Ucontext for normal 152 and begin executing the co-routine using co-routine stack 148 with the environment specified in Ucontext for co-routine 150, as shown in block 320. Processor 104 subsequently executes the function of the co-routine, as depicted in block 325. Context management utility 156 sets the state field of the co-routine to "unwound", which signals a "bounce" function to extract state save values from RAM 102, restore the previous context stored in Ucontext for normal 152, and utilize the original stack of the process to restart operations, as shown in block 330. Context structures that include "unwound" state field values may also be utilized to facilitate the debugging of memory leaks. As utilized herein, a memory leak refers to inadvertent consumption of memory by a program that fails to release (i.e., de-allocate) the memory when the program no longer needs to use the memory. Stack management utility 160 de-allocates the block within stack block 132 corresponding to the executed co-routine, as depicted in block 335, and the process terminates at block 340. The process of de-allocating stack blocks is illustrated in FIG. 5, which is discussed below.

Figure 4:
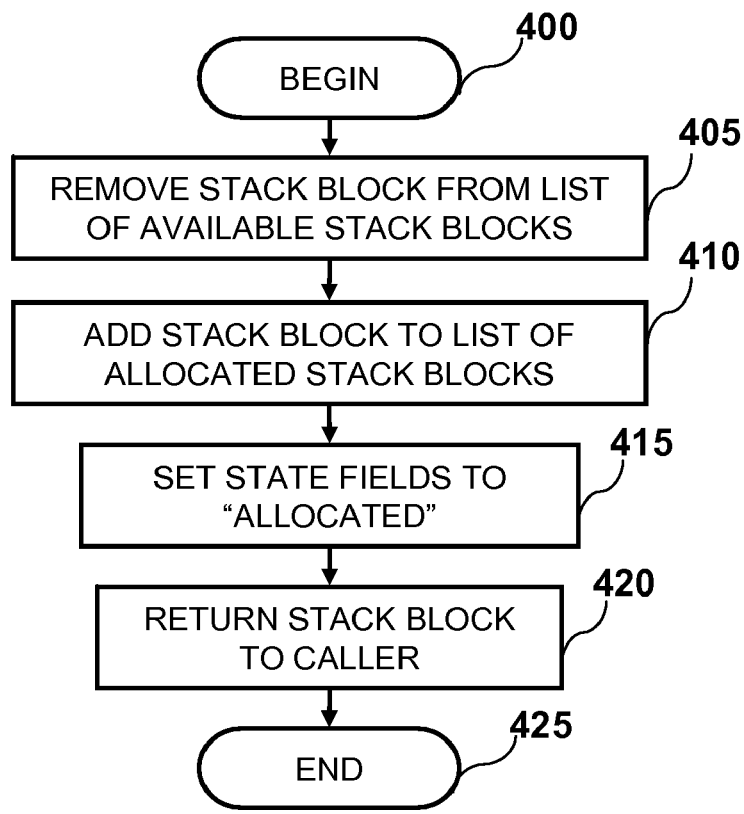
FIG. 4 is a high-level logical flowchart of a process for allocating a stack block, according to an embodiment of the present invention.

With reference now to FIG. 4, there is illustrated a high-level logical flowchart of a process for allocating a stack block, according to an embodiment of the present invention. The process is preferably performed by an "Allocate Stack" function included in stack management utility 160 and begins at block 400 in response to applications 128 calling the "Allocate Stack" function (e.g., as shown in block 310 of FIG. 3). Stack management utility 160 removes a block from a list of free (i.e., unallocated) stack blocks in stack block 132, as depicted in block 405. Stack management utility 160 subsequently adds the block that was removed from the list of free stack blocks to a list of allocated stack blocks, as shown in block 410. Stack management utility 160 sets the state field of the allocated stack block to an "allocated" value, as depicted in block 415. Stack management utility 160 returns the allocated stack block to the caller, as shown in block 420, and the process terminates at block 425. As utilized herein, a caller refers to any functional process (e.g., applications 128) that utilizes stack blocks to perform a process.

Figure 5:
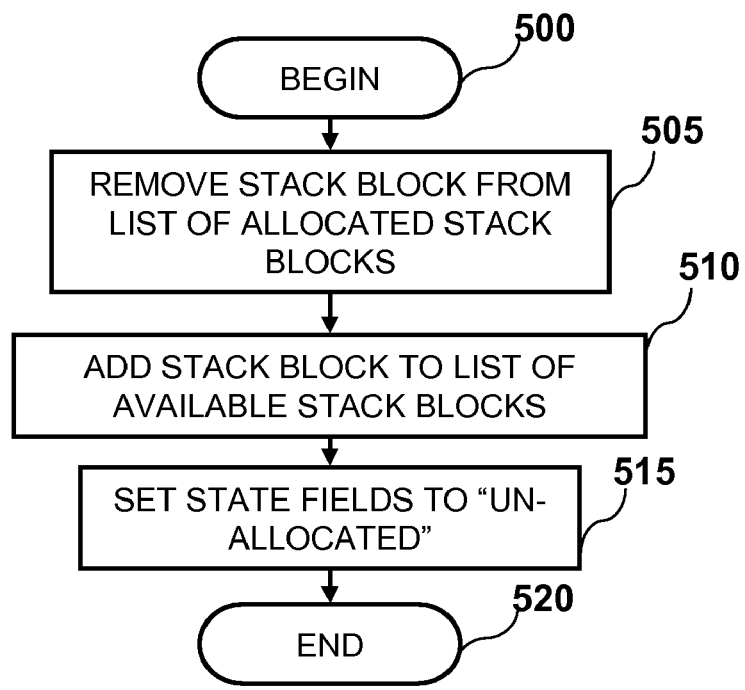
FIG. 5 is a high-level logical flowchart of a process for de-allocating a stack block, according to an embodiment of the present invention.

With reference now to FIG. 5, there is illustrated a high-level logical flowchart of a process for de-allocating a stack block, according to an embodiment of the present invention. The process is preferably performed by a "De-Allocate Stack" function included in stack management utility 160 and begins at block 500 in response to applications 128 calling the "De-Allocate Stack" function (e.g., as shown in block 335 of FIG. 3). Stack management utility 160 removes a block from a list of allocated stack blocks in stack block 132, as depicted in block 505. Stack management utility 160 subsequently adds the block that was removed from the list of allocated stack blocks to a list of un-allocated (i.e., "available") stack blocks, as shown in block 510. Stack management utility 160 sets the state field of the allocated stack block to an "un-allocated" value, as depicted in block 515, and the process terminates at block 520.

Figure 6:
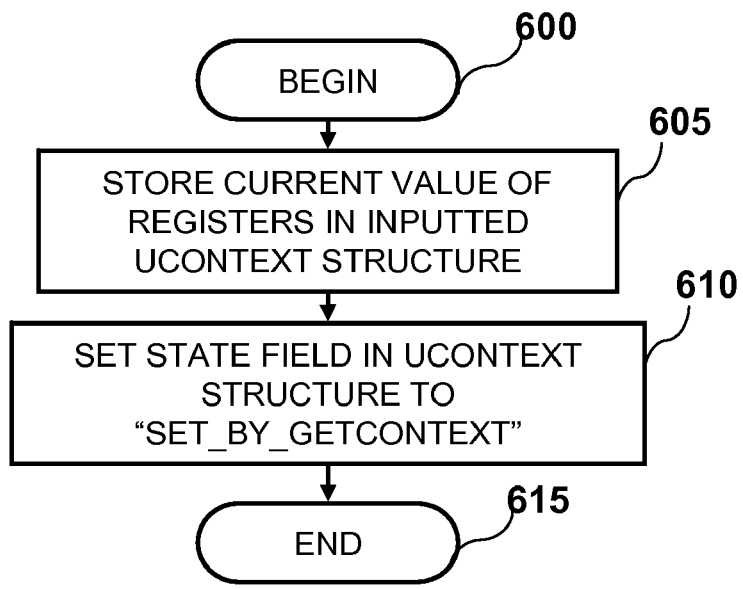
FIG. 6 is a high-level logical flowchart of a process for retrieving context information from co-routines, according to an embodiment of the present invention.

With reference now to FIG. 6, there is illustrated a high-level logical flowchart of a process for retrieving context information from co-routines, according to an embodiment of the present invention. The process begins at block 600 in response to OS 130 calling the "getcontext" Ucontext function to issue a request for information on the current context of a co-routine or process. Context management utility 156 stores the current values of one or more registers corresponding to context information of the co-routine, as depicted in block 605. Context management utility 156 then sets the state field in the context structure of the co-routine to a "set_by_getcontext" value, as shown in block 610, and the process terminates at block 615. As utilized herein, the "set_by_getcontext" value shows that the "getcontext" Ucontext function updated the context of a co-routine.

Figure 7:
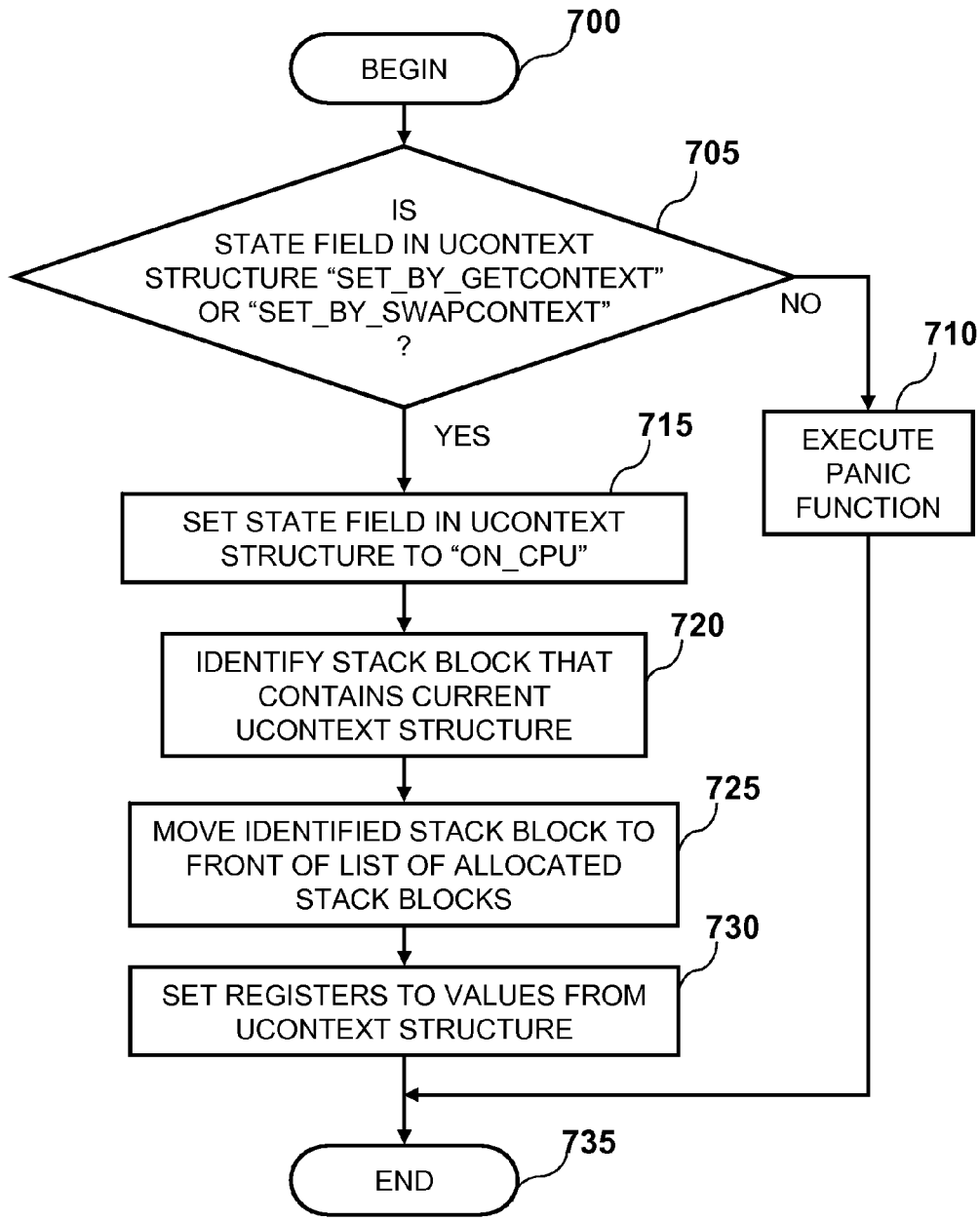
FIG. 7 is a high-level logical flowchart of a process for setting context information of co-routines, according to an embodiment of the present invention.

With reference now to FIG. 7, there is depicted a high-level logical flowchart of a process for setting context information of co-routines, according to an embodiment of the present invention. The process begins at block 700 in response to context management utility 156 updating the current context of a co-routine or process. A determination is made at block 705 whether the state field in the context structure of the co-routine contains a "set_by_getcontext" or a "set_by_swapcontext" value. As utilized herein, the "set_by_swapcontext" shows that the "swapcontext" Ucontext function was utilized to save the current context in a context structure and set the executed context to a different context (i.e., asynchronously move execution from one co-routine to another). If the state field in the context structure of the co-routine does not contain a "set_by_getcontext" or a "set_by_swapcontext" value, state save and panic function 158 executes a state save, as shown in block 710, and the process terminates at block 735. The state save invokes state save processing that is modified to save stack blocks 132, as illustrated in FIGS. 8 and 9, which are discussed below.

In FIG. 7, if the state field in the context structure of the co-routine contains a "set_by_getcontext" or a "set_by swapcontext" value, context management utility 156 sets the state field in the Ucontext structure of the current context to a "on_cpu" value to show that the current context is being executed by processor 104, as depicted in block 715. The logic of FIG. 7 is invoked with a pointer to a context structure (i.e., Ucontext for co-routine 150 or Ucontext for normal 152). At block 720, the code determines which stack block 132 these context structures are a part of. Stack management utility 160 moves the identified block to the front of a list of allocated stack blocks, as depicted in block 725. Context management utility 156 updates the values of one or more registers corresponding to the current co-routine to include the context information (e.g., a state field and a stack pointer) of the current context, as shown in block 730, and the process terminates at block 735.

With reference now to FIG. 8, there is illustrated a high-level logical flowchart of a method of implementing a controlled state save of stack block 132, according to an embodiment of the present invention. The process begins at step 800 in response to state save and panic function 158 initiating a state save. A determination is made whether the number of allocated blocks within stack block 132 is greater than the sum of the most recently used context value and the least recently used context value, as depicted in step 805. In one embodiment, the most recently used context value and the least recently used context values are specified by a user of data processing system 100. If the number of allocated blocks is less than or equal to the sum of the most recently used context value and the least recently used context value, the process proceeds to step 850, which is discussed below.

If the number of allocated blocks is greater than or equal to the sum of the most recently used context value and the least recently used context value, state save and panic function 158 sets a pointer to mark the beginning of a list of allocated stack blocks, and state save and panic function 158 clears a count variable, as shown in step 810. A determination is made whether the value of the count variable is less than the most recently used context value, as shown in step 815. If the value of the count variable is less than the most recently used context value, state save and panic function 158 saves the block within stack block 132 that is identified by the pointer, as depicted in step 820. State save and panic function 158 subsequently increments the count variable and the pointer to identify the next block within stack block 132, as shown in step 825, and the process returns to step 815.

If the value of the count variable is greater than the most recently used context value, state save and panic function 158 sets the pointer to mark the end of the list of allocated stack blocks and clears the value of the count variable, as depicted in step 830. A determination is made whether the value of the count variable is less than the least recently used context value, as shown in step 835. If the value of the count variable is less than the least recently used context value, state save and panic function 158 saves the block within stack block 132 that is identified by the pointer, as depicted in step 840. State save and panic function 158 subsequently increments the count variable and the pointer to identify the next block within stack block 132, as shown in step 845, and the process returns to step 835. If the value of the count variable is greater than or equal to the least recently used context value, the process returns control to the caller of state save and panic function 158 at step 870.

At step 850, state save and panic function 158 sets the pointer to mark the beginning of the list of allocated blocks within stack block 132. A determination is made whether the pointer marks the end of the list of allocated blocks within stack block 132, as depicted in step 855. If the pointer does not mark the end of the list of allocated stack blocks, state save and panic function 158 saves the entry within stack block 132 that is identified by the pointer, as depicted in step 860. State save and panic function 158 subsequently increments the pointer to identify the next block within stack block 132, as shown in step 865, and the process returns to step 855. If the pointer marks the end of the list of allocated stack blocks, the process returns control to the caller of state save and panic function 158 at step 870.

Turning now to FIG. 9, there is depicted a high-level logical flowchart of an alternative method of implementing a state save of a single stack block, according to the present invention. The process begins at step 900 in response to state save and panic function 158 initiating a state save. State save and panic function 158 calculates handles for one or more co-routines based on the current handle to stack block 132, as depicted in step 905. As utilized herein, a handle refers to a variable that identifies the location of a value in RAM 102 (i.e., a pointer). State save and panic function 158 saves the current context and the current value of stack control 154 in a state save buffer (not shown), as depicted in step 910.

A determination is made whether the state field in the Ucontext structure of the current co-routine contains a "set_by_getcontext" or a "set_by_swapcontext" value, as shown in step 915. If the state field in the Ucontext structure of the current co-routine does not contain a "set_by_getcontext" or a "set_by swapcontext" value, state save and panic function 158 saves the state of each of the contexts within co-routine stack 148 (i.e., the entire stack), as depicted in step 920, and the process terminates at step 935.

If the state field in the Ucontext structure of the current co-routine contains a "set_by_getcontext" or a "set_by swapcontext" value, state save and panic function 158 identifies the location of a stack pointer stored in the Ucontext structure of the current co-routine (i.e., the co-routine executed prior to the initiation of the state save), as shown in step 925. State save and panic function 158 saves the state of each context located in the portion of co-routine stack 148 between the location of the stack pointer and the end of the stack (i.e., only the portion of stack block 132 containing the context structures of the co-routine), as depicted in step 930, and the process terminates at step 935.

The present invention thus enables state save and other debug operations for co-routines for FFDC in an event-driven environment. The underlying code that provides context and stack management services within data processing system 100 is able to intelligently, efficiently, and selectively save stacks and context debug information for FFDC. Wrapper code executes ported code on different stacks by utilizing different contexts, suspends a context that is waiting for a call-back, and then resumes the context from the stack once the call-back is performed. The present invention thus enables a platform or OS component to provide services to allocate stack space, create contexts, and swap between contexts stored in a stack.

It is understood that the use herein of specific names are for example only and not meant to imply any limitations on the invention. The invention may thus be implemented with different nomenclature/terminology and associated functionality utilized to describe the above devices/utility, etc., without limitation.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   allocating a stack block in a buffer;
   initializing a first context structure of a first co-routine in said buffer, wherein a context structure is a data structure comprising a stack pointer and a state field for managing contexts;
   when a process calls for execution of a second co-routine:
      saving a state of said first context structure in said state field; and
      setting a second context structure associated with said second co-routine as a current context; and
   when execution of said current context is complete, restoring said first context structure of said first co-routine as a next current context; and
   executing a state save operation in response to said state field of said first context structure not being set to a valid value, wherein the state save operation state saves all allocated co-routine stacks and context structures to permanent storage.

2. The method of claim 1, wherein:
   initializing said first context structure of said first co-routine further comprises:
      removing a stack block in said buffer from a list of available stack blocks;
      adding said stack block to a list of allocated stack blocks;
      setting said state field of said first context structure to an "allocated" value; and
      providing said stack block to a caller corresponding to said first context structure; and
   restoring said first context structure as the next current context further comprises:
      removing a stack block in said buffer from a list of allocated stack blocks;
      adding said stack block to a list of available stack blocks; and
      setting said state field of said second context structure to an "unallocated" value.

3. The method of claim 1, wherein saving said state of said first context structure further comprises:
storing a current value corresponding to said first context structure from a register to a permanent storage location; and
setting said state field of said first context structure to a "set_by_getcontext" value.

4. The method of claim 1, wherein setting said second context structure associated with said second co-routine as said current context further comprises:
in response to said state field not having a "set_by_getcontext" value and said state field not having a "set_by_swapcontext" value, executing a state save operation to restore said buffer to a most recent valid state, wherein a first failure data capture (FFDC) is completed;
in response to said state field including said "set_by_getcontext" value, setting said state field of said second context structure to an "on_cpu" value indicating that said second context structure is the next current context;
in response to said state field including said "set_by_swapcontext" value, setting said state field of said second context structure to said "on_cpu" value indicating that said second context structure is the next current context;
in response to said second context structure being the next current context, moving a stack block corresponding to said second context structure to a front of a list of allocated stack blocks within said buffer; and
updating a register with a value from said second context structure.

5. The method of claim 1, wherein executing said state save operation to restore said buffer further comprises:
when a number of allocated stack blocks in said buffer is greater than a sum of a pre-defined number of most recently used stack blocks and a pre-defined number of least recently used stack blocks:
setting a pointer to a beginning of a list of allocated stack blocks in said buffer; initializing a count variable;
when said count variable is less than said number of most recently used stack blocks:
saving one of said allocated stack blocks identified by said pointer in a permanent storage location;
incrementing said pointer and said count variable; and
when said count variable is not less than said number of most recently used stack blocks:
setting said pointer to an end of said list of allocated stack blocks in said buffer;
clearing said count variable; and
when said count variable is less than said number of least recently used stack blocks:
saving one of said allocated stack blocks identified by said pointer in a permanent storage location;
incrementing said pointer and said count variable.

6. The method of claim 5, wherein executing said state save operation to restore said buffer further comprises:
when said number of allocated stack blocks in said buffer is not greater than a sum of a pre-defined number of most recently used stack blocks and a pre-defined number of least recently used stack blocks:
setting a pointer to a beginning of a list of allocated stack blocks in said buffer; and
when said pointer does not correspond to an end of said list of allocated stack blocks:
saving one of said allocated stack blocks corresponding to said pointer in a permanent storage location; and
incrementing said pointer.

7. A computer system comprising:
a processor;
a memory coupled to said processor; a buffer within said memory;
a utility executing on the processor and which comprises code for:
allocating a stack block in a buffer;
initializing a first context structure of a first co-routine in said buffer, wherein a context structure is a data structure comprising a stack pointer and a state field for managing contexts;
saving a state of said first context structure when a process calls for execution of a second co-routine;
setting a second context structure associated with said second co-routine as a current context when said process calls for execution of said second co-routine; and
restoring said first context structure of said first co-routine as a next current context when execution of said current context is complete;
executing a state save operation in response to said state field of said first context structure not being set to a valid value, wherein the state save operation state saves all allocated co-routine stacks and context structures to permanent storage.

8. The computer system of claim 7, wherein:
said code for initializing said first context structure of said first co-routine further comprises code for:
removing a stack block in said buffer from a list of available stack blocks;
adding said stack block to a list of allocated stack blocks;
setting said state field of said first context structure to an "allocated" value; and
providing said stack block to a caller corresponding to said first context structure; and
said code for restoring said first context structure as the next current context further comprises code for:
removing a stack block in said buffer from a list of allocated stack blocks;
adding said stack block to a list of available stack blocks; and
setting said state field of said second context structure to an "unallocated" value.

9. The computer system of claim 7, wherein said code for saving said state of said first context structure further comprises code for:
storing a current value corresponding to said first context structure from a register to a permanent storage location; and
setting said state field of said first context structure to a "set_by_getcontext" value.

10. The computer system of claim 7, wherein said code for setting said second context structure associated with said second co-routine as said current context further comprises code for:
executing a state save operation to restore said buffer to a most recent valid state, wherein a first failure data capture (FFDC) is completed, in response to said state field not having a "set_by_getcontext" value and said state field not having a "set_by_swapcontext" value;
setting said state field of said second context structure to an "on_cpu" value indicating that said second context structure is the next current context in response to said state field including said "set_by_getcontext" value;
setting said state field of said second context structure to said "on_cpu" value indicating that said second context structure is the next current context in response to said state field including said "set_by_swapcontext" value;

moving a stack block corresponding to said second context structure to a front of a list of allocated stack blocks within said buffer in response to said second context structure being the next current context; and updating a register with a value from said second context structure.

11. The computer system of claim 7, wherein said code for executing said state save operation to restore said buffer further comprises code for:

when a number of allocated stack blocks in said buffer is greater than a sum of a pre-defined number of most recently used stack blocks and a pre-defined number of least recently used stack blocks:

setting a pointer to a beginning of a list of allocated stack blocks in said buffer;

initializing a count variable;

when said count variable is less than said number of most recently used stack blocks:

saving one of said allocated stack blocks identified by said pointer in a permanent storage location;

incrementing said pointer and said count variable; and when said count variable is not less than said number of most recently used stack blocks:

setting said pointer to an end of said list of allocated stack blocks in said buffer;

clearing said count variable; and when said count variable is less than said number of least recently used stack blocks:

saving one of said allocated stack blocks identified by said pointer in a permanent storage location;

incrementing said pointer and said count variable.

12. The computer system of claim 11, wherein said code for executing said state save operation to restore said buffer further comprises code for:

when said number of allocated stack blocks in said buffer is not greater than a sum of a pre-defined number of most recently used stack blocks and a pre-defined number of least recently used stack blocks:

setting a pointer to a beginning of a list of allocated stack blocks in said buffer; and when said pointer does not correspond to an end of said list of allocated stack blocks:

saving one of said allocated stack blocks corresponding to said pointer in a permanent storage location; and incrementing said pointer.

13. A computer program product comprising:

a non-transitory computer readable medium storing program code; and the program code on said non-transitory computer readable medium that when executed by a processor provides the functions of:

allocating a stack block in a buffer;

initializing a first context structure of a first co-routine in said buffer, wherein a context structure is a data structure comprising a stack pointer and a state field for managing contexts;

when a process calls for execution of a second co-routine:

saving a state of said first context structure; and setting a second context structure associated with said second co-routine as a current context;

when execution of said current context is complete, restoring said first context structure of said first co-routine as a next current context; and executing a state save operation to restore said buffer in response to said state field not being set to a valid value, comprising:

when a number of allocated stack blocks in said buffer is not greater than a sum of a pre-defined number of most recently used stack blocks and a pre-defined number of least recently used stack blocks:

setting a pointer to a beginning of a list of allocated stack blocks in said buffer; and when said pointer does not correspond to an end of said list of allocated stack blocks:

saving one of said allocated stack blocks corresponding to said pointer in a permanent storage location; and incrementing said pointer.

14. The computer program product of claim 13, wherein:

said code for initializing said first context structure of said first co-routine further comprises code for:

removing a stack block in said buffer from a list of available stack blocks;

adding said stack block to a list of allocated stack blocks;

setting said state field of said first context structure to an "allocated" value; and providing said stack block to a caller corresponding to said first context structure; and said code for restoring said first context structure as the next current context further comprises code for:

removing a stack block in said buffer from a list of allocated stack blocks;

adding said stack block to a list of available stack blocks; and setting said state field of said second context structure to an "unallocated" value.

15. The computer program product of claim 13, wherein said code for saving said state of said first context structure further comprises code for:

storing a current value corresponding to said first context structure from a register to a permanent storage location; and setting said state field of said first context structure to a "set_by_getcontext" value.

16. The computer program product of claim 13, wherein said code for setting said second context structure associated with said second co-routine as said current context further comprises code for:

in response to said state field not having a "set_by_getcontext" value and said state field not having a "set_by_swapcontext" value, executing said state save to restore said buffer to a most recent valid state, wherein a first failure data capture (FFDC) is completed;

in response to said state field including said "set_by_getcontext" value, setting said state field of said second context structure to an "on_cpu" value indicating that said second context structure is the next current context;

in response to said state field including said "set_by_swapcontext" value, setting said state field of said second context structure to said "on_cpu" value indicating that said second context structure is the next current context;

in response to said second context structure being the next current context, moving a stack block corresponding to said second context structure to a front of a list of allocated stack blocks within said buffer; and updating a register with a value from said second context structure.

17. The computer program product of claim 13, wherein said code for executing said state save operation to restore said buffer further comprises code for:

when said number of allocated stack blocks in said buffer is greater than a sum of a pre-defined number of most recently used stack blocks and a pre-defined number of least recently used stack blocks:
  setting a pointer to a beginning of a list of allocated stack blocks in said buffer;
  initializing a count variable;
  when said count variable is less than said number of most recently used stack blocks:
    saving one of said allocated stack blocks identified by said pointer in a permanent storage location;
    incrementing said pointer and said count variable; and when said count variable is not less than said number of most recently used stack blocks:
  setting said pointer to an end of said list of allocated stack blocks in said buffer;
  clearing said count variable; and
when said count variable is less than said number of least recently used stack blocks:
  saving one of said allocated stack blocks identified by said pointer in a permanent storage location;
  incrementing said pointer and said count variable.

* * * * *